Figure 9:
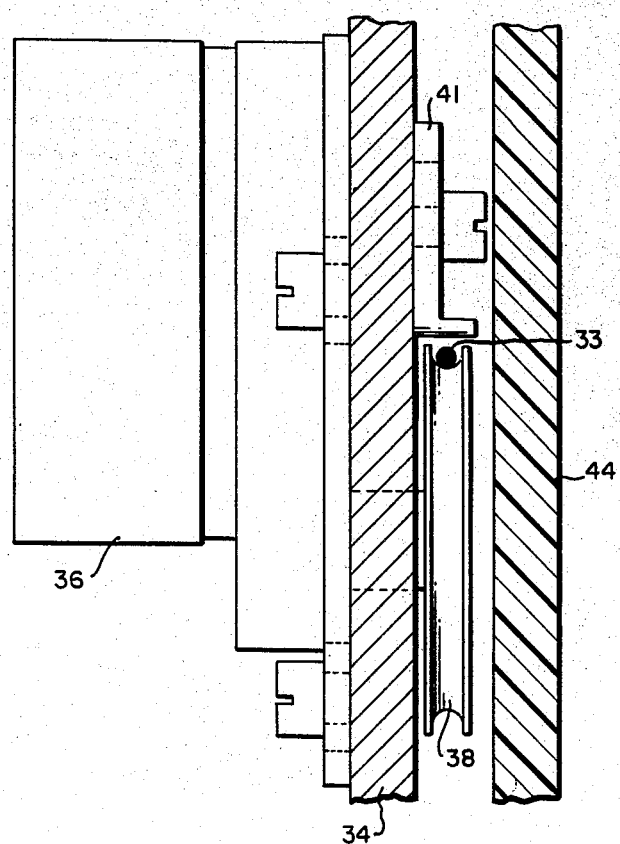

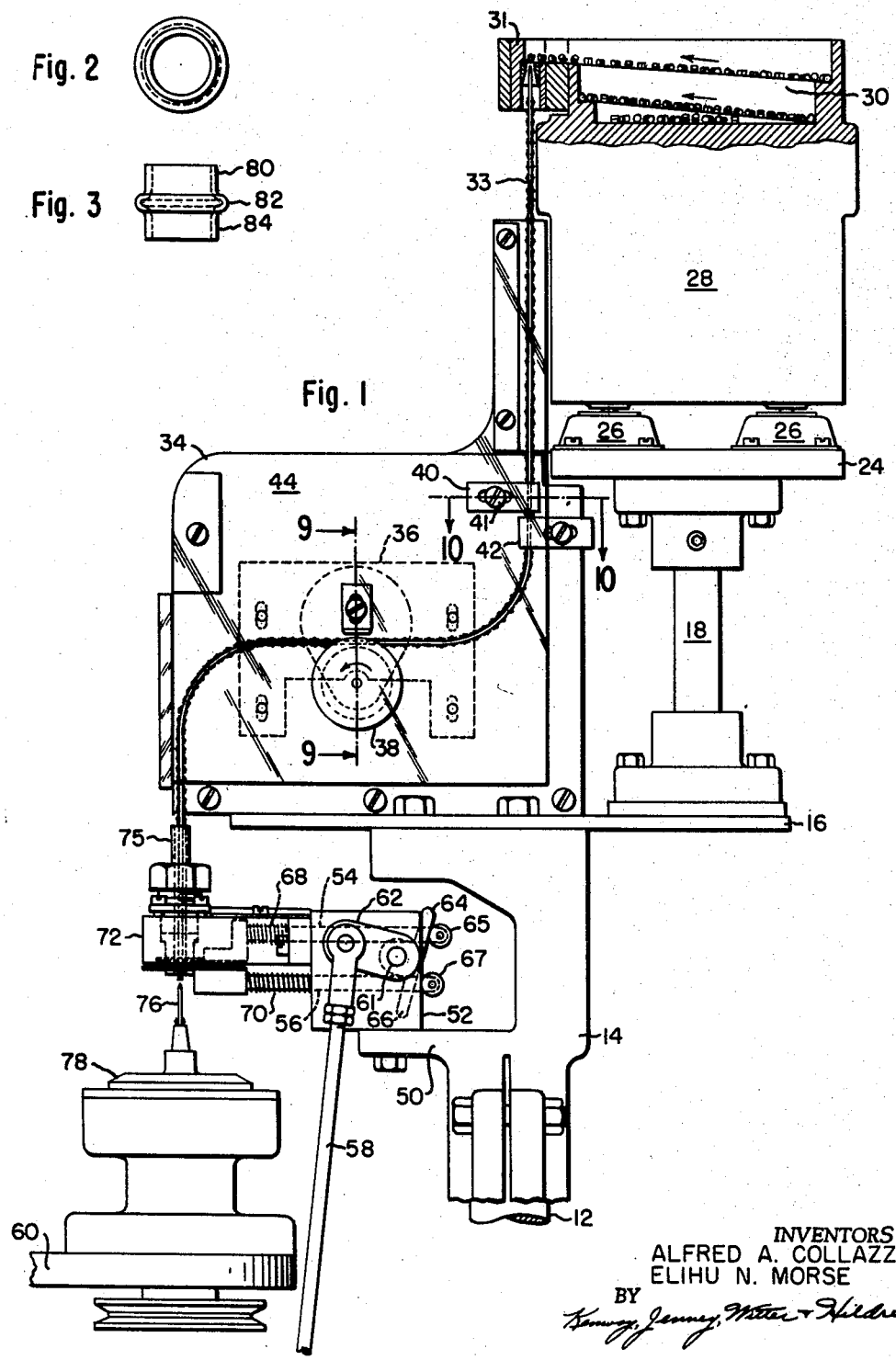

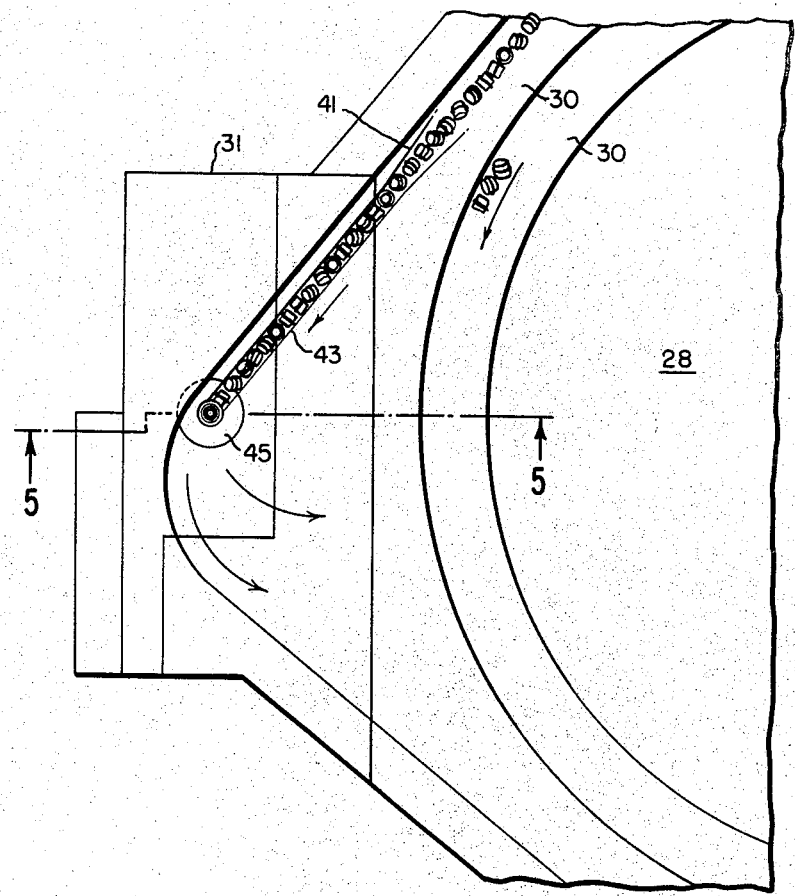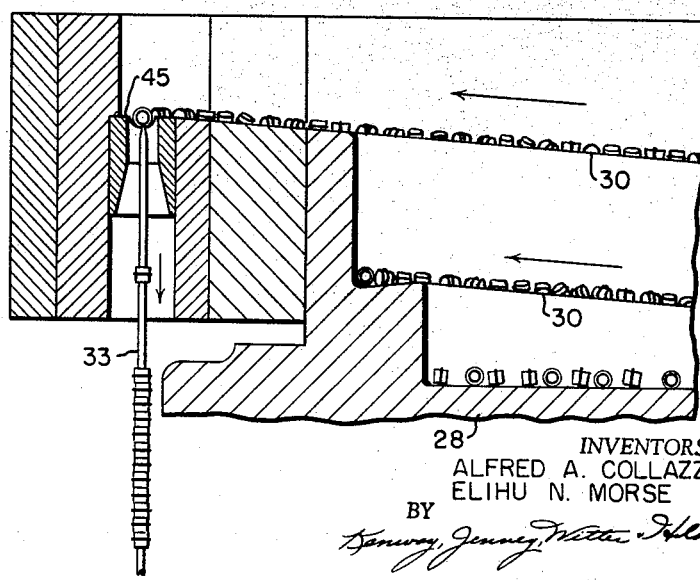

Aug. 23, 1960 A. A. COLLAZZO ET AL 2,950,026
APPARATUS FOR HANDLING ANNULAR ELEMENTS
Filed Sept. 13, 1957 4 Sheets-Sheet 3
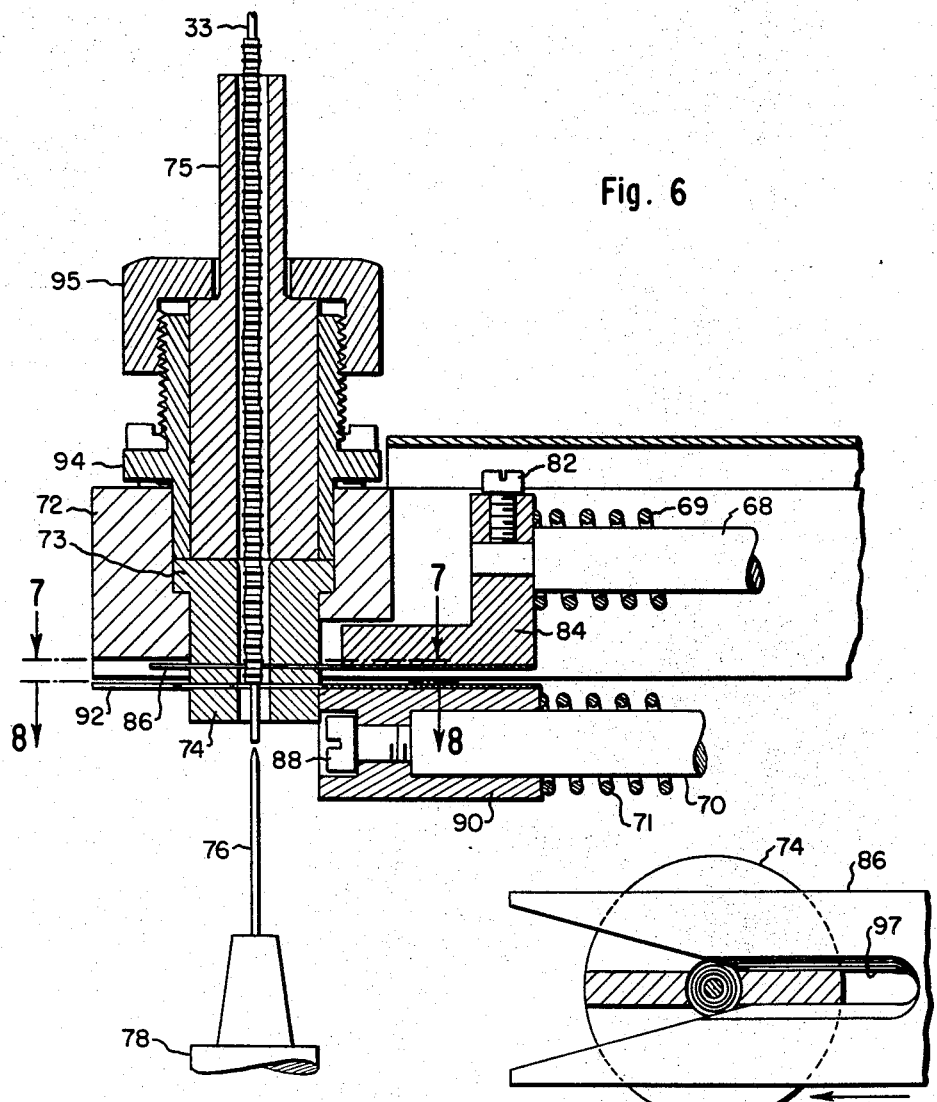
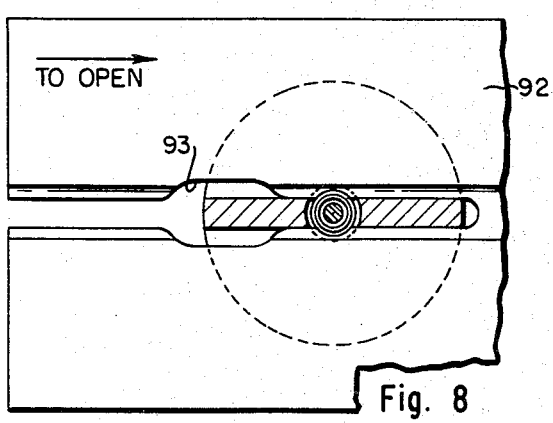
INVENTORS
ALFRED A. COLLAZZO
ELIHU N. MORSE
BY
ATTORNEYS Aug. 23, 1960   A. A. COLLAZZO ET AL   2,950,026
APPARATUS FOR HANDLING ANNULAR ELEMENTS
Filed Sept. 13, 1957                               4 Sheets-Sheet 4

INVENTORS
ALFRED A. COLLAZZO
ELIHU N. MORSE
BY
ATTORNEYS

United States Patent Office 2,950,026
Patented Aug. 23, 1960

2,950,026

APPARATUS FOR HANDLING ANNULAR ELEMENTS

Alfred A. Collazzo, Revere, and Elihu N. Morse, Swampscott, Mass., assignors, by mesne assignments, to Sylvania Electric Products Inc., Wilmington, Del., a corporation of Delaware Filed Sept. 13, 1957, Ser. No. 683,867

1 Claim. (Cl. 221—175)

This invention relates in general to the handling of small objects and in particular, to the conveying and orienting of eyelets.

The handling of small parts in manufacturing operations is difficult and time-consuming when done manually. The elimination of such manual operations has been, and remains, a goal in every area of manufacturing.

In the electronics industry perhaps more than in any other, the continued trend toward miniaturization of components has almost necessitated the replacement of manual effort by machine work. This is nowhere more evidenced than in the manufacture of semiconductor devices. The present invention is particularly well-suited to the handling of components for such devices although it has far broader applications. Specifically, the components to which the invention is most pertinent are annular elements typical of which are the eyelets or sleeves commonly used in the manufacture of semiconductor diodes.

It is the practice in the industry to seal two such eyelets to a piece of glass tubing such that each eyelet extends outwardly from the end of the tubing. Subsequently, the active elements, namely, the semiconductor die and so-called cat whisker, are mounted on studs and inserted from opposite ends of the assembly and the studs are then soldered or otherwise sealed in place in the eyelets. The sealing of the eyelets to the glass tubing is usually accomplished in a machine having a circular turret which carries a number of rotating heads. The heads are indexed from one station to another and fires are arranged about the various stations to which the heads index. These fires melt the glass and cause it to become sealed to the eyelets. The eyelets are preferably made of a metal having a coefficient of expansion which matches that of the glass in order that a durable seal can be made.

In one type of diode the eyelets have outside diameters of about .060" in the area of sealing. The inside diameter of the tubing runs sufficiently larger than .060" to permit insertion of the eyelets. The length of the eyelets is about .065" and the difficulties involved in manual loading and unloading of such small units to perform the sealing operation are obvious. Various automatic loading systems have been attempted but, because the length and diameter of the eyelet are so nearly the same, it is difficult to orient the eyelets properly. Obviously, to align the glass tubing and the eyelets axially in the head of the machine, a central spindle can be used. However, if a feed trough or tube is used in conjunction with the spindle it is obvious that the eyelets will tend to "tumble" and those eyelets which do not arrive at the end of the tube or trough with their axes aligned with that of the spindle, will not thread themselves upon the spindle. Stating the case generally, it has proven difficult to feed eyelets automatically to the heads of a sealing machine and the problem is further magnified when the eyelets have diameters similar in dimension to their lengths.

Therefore it is an object of the present invention to provide apparatus for consistently orienting and feeding eyelets.

It is a further object of the present invention to simplify the manufacture of devices having eyelets as components.

It is a still further object of the present invention to reduce the cost of manufacturing electronic devices.

It is another object of the present invention to further mechanize the manufacture and improve the quality of semi-conductor diodes.

Among the features of the present invention is a filamentary guide or wire on which the annular elements are threaded to be conveyed from a bulk source to a point of individual incorporation in a device. In the particular embodiment of the invention disclosed herein, the annular elements being handled are eyelets of the type described above for use in diodes.

A conventional vibratory feeding device is equipped with a terminal section which threads eyelets upon a filamentary guide member. No support is provided in direct contact with the filamentary guide, and the absence of such support enables the eyelets to follow the guide throughout its entire length. The guide derives only intermittent support by way of the eyelets threaded upon it. At the end of the filamentary guide an escapement device is provided to feed the eyelets one by one into position for incorporation in a device. For a better understanding of the present invention together with other objects, features and advantages, reference should be made to the following specification of a preferred embodiment of the invention which should be read in conjunction with the accompanying drawing in which:

Fig. 1 is a front elevation of the feeding device, guide member, and indexing sealing machine, partly cut away and partly in section, Figs. 2 and 3 are top and front views, respectively, of an eyelet of the type handled by the apparatus of Fig. 1, enlarged with respect to Fig. 1 to show greater detail.

Figure 10:
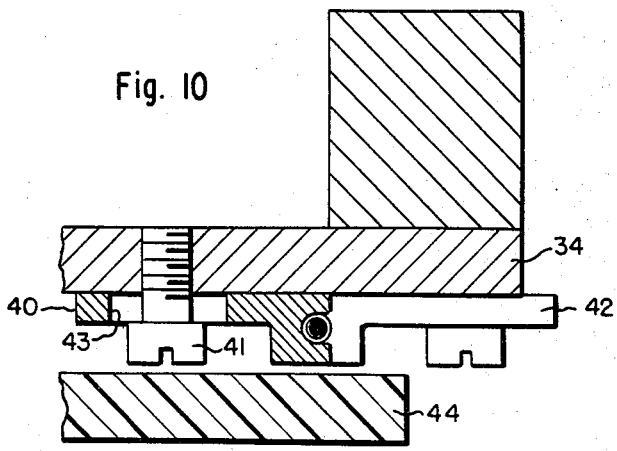

Fig. 4 is an enlarged detailed top view of the vibratory feeding device and the terminal section attached thereto, Fig. 5 is a sectional detailed front view of the apparatus shown in Fig. 4, taken on the line 5—5 of Fig. 4, Fig. 6 is an enlarged sectional side view of the escapement device at the discharge end of the filamentary guide member, Fig. 7 is an enlarged detailed top view of one element of the escapement device of Fig. 6, taken on the line 7—7 of Fig. 6, Fig. 8 is an enlarged top view of a second element of the escapement device of Fig. 6, taken on the line 8—8 of Fig. 6, Fig. 9 is an enlarged sectional side view of the vertical support mechanism for the filamentary guide member, taken on the line 9—9 of Fig. 1, and Fig. 10 is an enlarged top view of the lateral supports for the filamentary guide member, taken on the line 10—10 of Fig. 1.

The apparatus illustrated in Fig. 1 is a complete eyelet orienting and feeding unit incorporating the present invention. At the lower right hand corner of the drawing there may be seen a supporting standard 12 which is mounted on a pedestal or other suitable device and which provides basic support for the entire unit. Bolted to the standard 12 is a frame bracket 14 on which a flat support plate 16 is mounted. At one end of support plate 16, to the right as seen in the drawing, there is bolted a flanged pedestal 18, the upper flange of which is adjustable in height and which carries a support plate 24. Shock mounts 26 on plate 24 support a vibratory feeding device 28.

The vibratory feeding device 28 may be of the type commercially available under the trade-name "Syntron." Such devices typically consist of a vibrator which oscillates a bowl through a predetermined mechanical cycle.

The bowl is provided with a spiral track 30 which ascends the interior wall. Small articles are placed in quantity within the bowl and the vibratory action causes the articles to ascend the track more or less consecutively. The vibratory device thus far described is well-known and is used widely throughout industry for the handling of small articles.

In the present invention, however, a terminal section of special design is provided at the upper end of the spiral track of the vibratory apparatus. The terminal section includes a block 31 in which is formed a continuation of the spiral track of the vibratory apparatus, an aperture disposed vertically in the block and a wire or filament 33, the end of which extends just above the bottom surface of the continuation of the spiral track which intersects with the upper end of the vertical opening. The precise design and function of the terminal device will be explained in greater detail hereinbelow with reference to other figures giving more and enlarged detail.

Also mounted on plate 16, at the left as seen in the drawing, is a framework 34. Behind framework 34 is a drive motor 36 which drives a grooved wheel or sheave 38 rotatably mounted in front of framework 34. Two adjustable guide or buffer members 40 and 42 are also mounted on and in front of framework 34 and are so disposed that they may be adjusted in their position to maintain the filamentary guide 33 in the desired position. A transparent plate 44 which may be made of plastic such as Lucite or Plexiglas, which are trade-names for a methyl methacrylate compound, may be utilized if desired to protect the guide and the eyelets threaded on the guide while permitting clear observation of the apparatus in operation.

There is also mounted on the bracket 14, an escapement device. A shelf 50 is formed in bracket 14 and bolted to the shelf 50 is a support block 52 in which two horizontal openings 54 and 56 are bored. A lever arm 58 which is actuated by a mechanism (not shown) synchronized with the sealing machine 60 is pivotally connected to crank arm 62. The crank arm 62 is clamped on shaft 61 which in turn carries a cam member having camming surfaces 64 and 66. The cam member is keyed to shaft 61 so that generally vertical movement of lever arm 58 causes the cam member to pivot about shaft 61. Passing through horizontal bore 54 is a spring-loaded shaft 68, and a corresponding spring-loaded shaft 70 passes through bore 56. There is also mounted on block 52 an extension 72 which contains the escapement mechanism. The escapement mechanism includes a tubular bushing 75 through which the filamentary guide member 33 passes axially and which is aligned with a spindle 76 mounted on a head 78 of the sealing machine 60. The details of construction and the operation of the escapement mechanism are explained more fully hereinafter with reference to subsequent figures.

An eyelet or sleeve of the type which is well-suited to handling by the disclosed embodiment of the present invention is illustrated in Figs. 2 and 3. The eyelet shown in Figs. 2 and 3 is enlarged twenty times with respect to those shown in Fig. 1 to facilitate understanding of the subsequent disclosure on eyelet handling. The eyelet is generally in the shape of a hollow cylinder or tube and includes a first straight section 80, an enlarged central section 82 and a second straight section 84 similar to section 80.

Fig. 4 is a fragmentary view, quadrupled in size relative to Fig. 1, of the vibratory feeding device 28 and the terminal threading mechanism 31 at the top of the spiral track of the vibratory feeding device. Fig. 5 is a sectional side view of the same portion of the apparatus and the two figures, when considered together, provide a clear understanding of the method and structure by which the eyelets are threaded on the filamentary guide member.

Eyelets are placed in quantity and in random distribution and orientation in the bowl of the vibratory feeding device 28. Vibration of the feeding device causes the eyelets to ascend the spiral track 30 until they reach the terminal section 31. The spiral track is tapered inwardly to reduce its width gradually as is shown at a point 41 just ahead of its junction with the track which is formed in the terminal device 31. The track in the terminal device 31 is actually a semi-circular groove 43 cut in a flat horizontal surface. The semi-circular groove 43 extends to an opening formed vertically through the body of the terminal section. In the vertical opening there is provided a bushing 45 which has a semi-circular grooved top surface matching that of the grooved path 43. The inside diameter of the bushing at the top surface is just slightly larger than the maximum outside diameter of the eyelet. The filamentary guide member 33 extends through the bushing 45 and terminates in a point which extends several thousandths of an inch above the bottom surface of the semi-circular groove in bushing 45.

Thus, as eyelets are fed along the spiral track and on to the grooved track of the terminal device 31 by the vibrating action of the feeder 28, their lower surfaces are intercepted by the upwardly extending pointed portion of filamentary guide 33. Eyelets which reach bushing 45 lying on their sides are caught by the pointed portion of the filamentary guide 33 and tumble into the opening in bushing 45 as they become threaded on to the guide member 33. Similarly, when eyelets arrive at the bushing 45 in an upright position, that is with their cylindrical axes in a vertical position, the vibrating action causes the eyelets to be either dropped over the point of guide member 33 or to be carried beyond the bushing 45. Those which pass beyond the bushing fall back into the hopper of vibratory feeding device 28. Because the rate of feeding of eyelets by the vibratory device is much faster than is necessary to keep the guide member fully supplied with eyelets, operation of the apparatus is not handicapped by the failure of some of the eyelets to become threaded upon the guide member 33 in the fashion noted.

Figs. 6, 7 and 8 illustrate details of the escapement mechanism of the invention. Some explanation has previously been given of the escapement device as it appears in Fig. 1. However, the enlarged showing of Fig. 6 aids in understanding of the operation of the device.

The shafts 68 and 70 as previously noted extend through the horizontal holes 54 and 56, respectively, in the block 52. A cam following roller 65 is mounted on the end of the shaft 68 and a similar roller 67 is mounted on the end of the shaft 70.

The opposite end of the shaft 68 is of reduced diameter and an L-shaped member 84 which carries a stop gate 86 is secured to the reduced end of the shaft by means of a clamping screw 82 threaded into the L-shaped member. Compressed between the support block 52 and the member 84, and surrounding the shaft 68 is a spring 69, normally tending to force the member 84 away from the block 52. This same spring force tends also to maintain the follower 65 in contact with the cam surface 64.

In somewhat similar fashion, there is end-mounted, by means of a screw 88, an end block 90 on the opposite end of the shaft 70. The end block 90 carries on its upper surface an escapement or release member 92 and compressed between the end block 90 and the support block 52 is a spring 71 surrounding the shaft 70. The spring 71 urges the end block 90 away from the block 52 and normally causes the follower 67 to be in contact with the cam surface 66. Despite the pressure of the spring 71, travel of the shaft 70 to the left as seen in the drawing is limited by the follower 67 coming in contact with the block 52.

The extension 72, which is supported from the block 52 provides basic support to the escapement mechanism. A shoulder is formed within the extension 72 and resting on that shoulder is a mating shoulder 73 of the slotted escapement tube 74. Bearing upon the shoulder 73 is a flanged, threaded bushing 94 attached to the extension 72 by screws through the flange. A cap nut 95 having a central opening is threaded on the bushing 94 and bears on a shoulder of the tubular bushing 75 through which the filamentary guide 33 passes. The guide 33 passes beyond the bushing 75 and through the slotted tube 74, terminating at a point just above the spindle 76.

As is indicated by the foregoing description, the filamentary guide member 33 is totally unsupported in the sense that at no point is it in direct contact with the frame of the apparatus or other permanent fixtures. An examination of Fig. 1 will show that the horizontal section of filamentary guide member 33 passes over the sheave 38. Also, as is clear from Fig. 1, and the other figures described, the filamentary guide member 33 passes vertically through the opening in terminal device 31 and also vertically through the opening in sleeve 74. The only vertical support provided to the filamentary guide member 33 comes by way of those eyelets threaded on the filamentary guide member which are in contact with sheave 38. In Fig. 9 the manner in which this support is provided is illustrated. The motor 36 is bolted to the support plate 34 and imparts to the sheave 38 a counter-clockwise rotation, as the sheave is shown in Fig. 1. The coupling between the motor 36 and the sheave 38 is by means of a V-belt or other suitable mechanism. Rotation of the sheave provides a means in addition to the force of gravity on the eyelets for overcoming friction between the guide member and the eyelets at the point the eyelets provide vertical support for the guide and threaded eyelets. An adjustable buffer 41 having a curved contact surface is attached to the framework 34 above the sheave 38 to prevent the guide member 33 and the eyelets which are threaded on the member from becoming dislodged from the peripheral groove of the sheave 38. An elongated opening in the buffer 41 through which the attaching screw passes permits adjustment of the buffer in a vertical direction.

Lateral support for the filamentary guide member is similarly provided by the previously mentioned buffers 40 and 42. These are illustrated in Fig. 10, and the sectional view through buffer 40 shows the elongated opening 43 through which the attaching screw 41 passes. The buffer 42 is similarly attached to the framework 34 and both buffers 40 and 42 may be clamped in any desired position to center the guide 33 in the opening of the bushings 45 and 75.

Although the operation of the various components of the apparatus has been explained in connection with the description of those components, a review of the general operation may aid in understanding the complete invention. At the outset a quantity of eyelets is placed in the hopper of the vibratory feeding device 28 in random distribution. The cyclic action of the vibrating feeding mechanism causes the eyelets to ascend the spiral track or ramp 30 to the terminal device 31. As the eyelets proceed along the semi-circular groove formed in terminal device 31, they arrive at the bushing 45 at which point they are either tipped onto the filamentary guide 33 or are simply dropped on the guide depending upon their orientation when they reach the bushing 45. As has previously been noted, some of the eyelets fall back into the hopper and are once more caused to ascend the track. The fact that the speed of the vibratory device is considerably greater than the speed of the escapement device permits proper operation despite the fact that a large percentage of the eyelets do not, in fact, become threaded upon the filamentary guide member on their first arrival at that point.

Those eyelets which become threaded on the guide 33 drop under the influence of gravity to the sheave 38. Some adjustment of buffers 40 and 42 may be needed when the apparatus is initially placed in operation, although it is usually necessary only to see that the flow of eyelets is not impeded. The tendency of the eyelets to come to a halt on the horizontal section of the guide 33 is overcome by the counter-clockwise rotation of the sheave 38 and the weight of the neutral column of eyelets, and they continue to the vertical section beyond and to the left of the sheave 38.

Again under the influence of gravity the eyelets drop through the sleeve 75 into the slotted escapement tube 74. The forked stop gate 86 passes through the slots of the escapement tube and reciprocates in response to movement of the lever arm 58. If it be assumed that the gate 86 is at first in a closed position, movement of the column of eyelets along the guide member 33 is stopped by the engagement of the waist section 82 of an eyelet with the top surface of member 86. Rotation of the turret 60 of the rotary sealing machine removes a head from position beneath the eyelet conveyor. As the head moves away, the lever arm 58 is tripped and moves upwardly. The crank 62 pivots about the fulcrum 61 causing the cam 64 to force the follower 65 to the right. The shaft 68 moves to the right against the pressure of spring 69 and the gate 86 assumes the position illustrated in Fig. 7. The entire column of eyelets is then free to drop through the gate 86.

As the gate 86 is opened, the release member 92 is moved into the stop position shown in Fig. 8. The upward movement of lever arm 58 and the resulting rotation of crank 62 permits the roller 67 to move to the left under the action of compression spring 71. The roller contacts the support block 52 which limits the travel of shaft 70 to the left despite the pressure exerted by the spring 71. Because the release member 92 is thus in the position shown in Fig. 8 during the upward movement of lever arm 58, the column of eyelets drops only as far as is indicated in Fig. 6.

Now, as the head 78 moves into position beneath the eyelet conveyor and the spindle 76 reaches a rest position directly under the guide 33, the lever arm 58 is retracted. The shaft 70 is moved to the right carrying the release member 92 with it. As the enlarged opening 93 passes under the eyelet column, a single eyelet drops onto the spindle 76.

Only one eyelet is dropped because simultaneously with the movement to the right of the member 92, the forked gate 86 moves to the left under the influence of the spring 69. The forked stop seizes upon the next eyelet in line beneath its enlarged waist portion shown at 82 in Fig. 3, and prevents the eyelet column from descending further. When the head 78 is indexed to its next position the entire cycle is repeated.

Although what has been illustrated and described is a preferred embodiment of the present invention, the applicability of the invention to the feeding of annular elements automatically in any process is obvious. Only minor modifications of the embodiment shown and described are necessary to accommodate such annular elements as beads, washers, nuts or the like. The invention is particularly useful when the dimensions of the annular elements are small and where height and diameter are similar, but the concepts of automatic threading and of no direct support to the guide are believed to be of breadth sufficient to permit their adaptation by those skilled in the art to numerous devices and products, irrespective of physical size.

Minor modifications of the apparatus itself for various purposes are contemplated and believed to be within the purview of the invention. For example, the sheave or wheel for overcoming friction between eyelets and the filamentary guide may be replaced by a vibrating or agitated guide member suitably shaped and properly controlled in its mechanical vibration cycle.

Also, the support provided to the filamentary guide via the eyelets need not be solely vertical. The guide member may be so formed that no section or part of it is horizontal. It is merely necessary that the supports used, even if they be on a diagonal between horizontal and vertical, be capable of exerting an upward, supporting component.

The invention should, therefore, be limited only by the spirit and scope of the appended claim.

What is claimed is:

Apparatus for conveying and orienting eyelets comprising a supporting frame, a vibratory feeding device mounted at the top of said frame including a reservoir for a supply of eyelets in random distribution, a spiral ramp formed about the internal wall of said feeding device leading from said reservoir and along which said eyelets are caused to ascend by the action of said feeding device, a terminal block attached to said feeding device and having a grooved track formed in the upper surface thereof, said track being a continuation of said ramp, said block having a substantially vertical opening formed therein and intersecting said grooved track adjacent the end thereof remote from said ramp, a filamentary guide member having substantially vertical upper and lower sections and a substantially horizontal central section, said guide member lying in a vertical plane adjacent said frame, said upper section of said guide member being disposed centrally in said vertical opening and terminating at a point within said grooved track, said eyelets becoming threaded upon said guide member by the action of said vibratory feeding device and the guidance of said grooved track, a sheave mounted on said frame beneath said horizontal section of said guide member, means for rotating said sheave, said eyelets threaded on said guide member and reaching the horizontal section thereof coming into contact with said sheave and being moved along said guide in response to rotation of said sheave, buffer means disposed adjacent and on both sides of said upper section of said guide member, said buffer means being in contact with eyelets passing down said upper section of said guide member and an escapement device adjacent the lower section of said guide member for releasing said eyelets one at a time from said member.

References Cited in the file of this patent

UNITED STATES PATENTS

| | | |
|---|---|---|
| 1,486,818 | Whitehead | Mar. 11, 1924 |
| 1,622,243 | Andrews | Mar. 22, 1927 |
| 1,646,571 | Avis | Oct. 25, 1927 |
| 1,856,951 | Foerster | May 3, 1932 |
| 1,897,156 | Forster | Sept. 27, 1932 |
| 2,214,814 | Hambleton | Sept. 17, 1940 |
| 2,369,660 | Carr | Feb. 20, 1945 |
| 2,456,433 | Lofgreen | Dec. 14, 1948 |
| 2,494,227 | Campbell et al. | Jan. 10, 1950 |
| 2,615,184 | Williams | Oct. 28, 1952 |
| 2,725,971 | Clark-Riede | Dec. 6, 1955 |
| 2,770,352 | Moller | Nov. 13, 1956 |
| 2,796,986 | Rajchman et al. | June 25, 1957 |